United States Patent
Qiao et al.

(10) Patent No.: US 9,097,225 B2
(45) Date of Patent: Aug. 4, 2015

(54) METHOD TO DETECT PARTIAL FAILURE OF DIRECT-INJECTION BOOST VOLTAGE

(71) Applicants: Ningsheng Qiao, Troy, MI (US); Michael Cottrell, White Lake, MI (US); Francois Fabre, West Bloomfield, MI (US)

(72) Inventors: Ningsheng Qiao, Troy, MI (US); Michael Cottrell, White Lake, MI (US); Francois Fabre, West Bloomfield, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 242 days.

(21) Appl. No.: 13/738,319

(22) Filed: Jan. 10, 2013

(65) Prior Publication Data

US 2014/0190453 A1    Jul. 10, 2014

(51) Int. Cl.
*F02M 51/00* (2006.01)
*F02D 41/20* (2006.01)
*F02D 41/22* (2006.01)

(52) U.S. Cl.
CPC ............ *F02M 51/00* (2013.01); *F02D 41/20* (2013.01); *F02D 41/221* (2013.01); *F02M 51/005* (2013.01); *F02D 2041/2006* (2013.01); *F02D 2041/2013* (2013.01); *F02D 2041/2058* (2013.01); *F02D 2041/2086* (2013.01); *F02D 2400/08* (2013.01); *Y02T 10/40* (2013.01)

(58) Field of Classification Search
CPC ...... F02M 51/00; F02M 51/005; F02D 41/22; F02D 41/402; F02D 41/221; F01L 9/04
USPC ................ 123/479, 478, 299, 480, 300, 490; 701/104, 114; 327/110, 326, 434; 307/104
See application file for complete search history.

(56) References Cited

U.S. PATENT DOCUMENTS

| | | | | |
|---|---|---|---|---|
| 4,604,675 A * | 8/1986 | Pflederer | ........................ | 361/155 |
| 5,979,412 A * | 11/1999 | Werner | ........................ | 123/490 |
| 7,520,259 B2 * | 4/2009 | Barnes et al. | ................. | 123/299 |
| 7,822,537 B2 * | 10/2010 | Perryman et al. | ............ | 701/114 |
| 2004/0244778 A1 * | 12/2004 | Tanaka et al. | ................. | 123/479 |
| 2006/0207564 A1 * | 9/2006 | Kinose | ........................ | 123/431 |
| 2007/0023011 A1 * | 2/2007 | Ohno et al. | ................... | 123/479 |
| 2010/0033116 A1 * | 2/2010 | Nouvel | ........................ | 318/116 |

\* cited by examiner

*Primary Examiner* — Lindsay Low
*Assistant Examiner* — George Jin

(57) ABSTRACT

A power supply diagnostic circuit includes a switching power supply that generates a voltage for powering a fuel injector. An injector control module selectively applies the voltage to the fuel injector and monitors a resultant electrical current flow through the fuel injector. The switching power supply includes a dual path circuit comprising two inductors, two MOSFETs, and two diodes. The injector control module determines whether one path of the dual path circuit is defective based on the electrical current flow.

15 Claims, 3 Drawing Sheets

METHOD TO DETECT PARTIAL FAILURE OF DIRECT-INJECTION BOOST VOLTAGE

FIELD

The present disclosure relates to detecting a partial failure of series inductors in a boost switching power supply.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some modern vehicles employ a boost switching power supply that provides power for fuel injectors, such as in a high pressure gasoline direct-injection fuel system. In some embodiments the boost switching power supply employs dual drivers with associated inductors. Such power supplies can use inductors that are relatively small and easier to package.

The dual drive power supply architecture presents a problem with regard to fault detection. In particular, there is a chance that one of the dual drive circuits can fail and thereby reduce the total energy available to the fuel injector drivers. With such a failure mode the power supply would continue to operate however its power output capacity would be reduced. This could reduce the ability to open the fuel injectors during high engine speed, dual fuel pulses per engine cycle, and the like.

SUMMARY

A power supply diagnostic circuit includes a switching power supply that generates a voltage for powering a fuel injector. An injector control module selectively applies the voltage to the fuel injector and monitors a resultant electrical current flow through the fuel injector. The switching power supply includes a dual path circuit comprising two inductors, two MOSFETs, and two diodes. The injector control module determines whether one path of the dual path circuit is defective based on the electrical current flow.

In other embodiments the injector control module determines whether the one path is defective based on whether the electrical current flow exceeds a predetermined current limit within a predetermined amount of time after the voltage is applied to the fuel injector during high engine speed and dual fuel injection pulses. The injector control module determines whether the one path is defective based on whether the voltage that is applied to the fuel injector sags below a predetermined voltage limit during high engine speed and dual fuel injection pulses. The power supply diagnostic circuit includes a current shunt that generates a signal based on the current flow and communicates the signal to the injector control module and at least one transistor that is controlled by the injector control module and that switches the voltage that is applied to the fuel injector. The injector control module modifies the fuel injector pulse width in association with determining whether the one path is defective.

A diagnostic method is provided for a power supply circuit. The method includes employing a boost power supply that includes a dual path circuit for generating a voltage for powering a fuel injector, selectively applying the voltage to the fuel injector, monitoring a resultant electrical current flow through the fuel injector; and determining whether one path of the dual path circuit is defective based on the electrical current flow.

In other embodiments the method includes determining whether the one path is defective based on whether the electrical current flow exceeds a predetermined current limit within a predetermined amount of time after the voltage is applied to the fuel injector during high engine speed and dual fuel injection pulses. The method includes determining whether the one path is defective based on whether the voltage that is applied to the fuel injector sags below a predetermined voltage limit during high engine speed and dual fuel injection pulses. The method includes generating a signal based on the current flow and communicating the signal to an injector control module. The method includes switching the voltage that is applied to the fuel injector. The method includes modifying the fuel injector pulse width in association with determining whether the one path is defective.

A power supply diagnostic circuit includes switching power supply means for generating a voltage for powering a fuel injector, and injector control means for selectively applying the voltage to the fuel injector and monitoring a resultant electrical current flow through the fuel injector. The switching power supply means includes a dual path circuit comprising two inductors, two MOSFETs, and two diodes, and the injector control means determines whether one path of the dual path circuit is defective based on the electrical current flow.

In other embodiments the injector control means includes diagnostic means for determining whether the one path is defective based on whether the electrical current flow exceeds a predetermined current limit within a predetermined amount of time after the voltage is applied to the fuel injector during high engine speed and dual fuel injection pulses. The diagnostic means includes means for determining whether the one path is defective based on whether the voltage that is applied to the fuel injector sags below a predetermined voltage limit during high engine speed and dual fuel injection pulses. The power supply diagnostic circuit includes current shunt means for generating a signal based on the current flow and communicating the signal to the injector control means. The power supply diagnostic circuit includes at least one transistor switching means for switching the voltage that is applied to the fuel injector. The injector control means modifies the fuel injector pulse width in association with determining whether the one path is defective.

A computer readable memory includes instructions for a processor wherein the instructions implement a diagnostic method for a power supply circuit. The method includes employing a boost power supply that includes a dual path circuit for generating a voltage for powering a fuel injector, selectively applying the voltage to the fuel injector, monitoring a resultant electrical current flow through the fuel injector; and determining whether one path of the dual path circuit is defective based on the electrical current flow.

In other embodiments the computer readable memory includes instructions for determining whether the one path is defective based on whether the electrical current flow exceeds a predetermined current limit within a predetermined amount of time after the voltage is applied to the fuel injector during high engine speed and dual fuel injection pulses. The computer readable memory includes instructions for determining whether the one path is defective based on whether the voltage that is applied to the fuel injector sags below a predetermined voltage limit during high engine speed and dual fuel injection pulses. The computer readable memory includes instructions for generating a signal based on the current flow and communicating the signal to an injector control module. The computer readable memory includes instructions for switching the voltage that is applied to the fuel injector. The computer readable memory includes instructions for modifying the fuel injector pulse width in association with determining whether the one path is defective.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
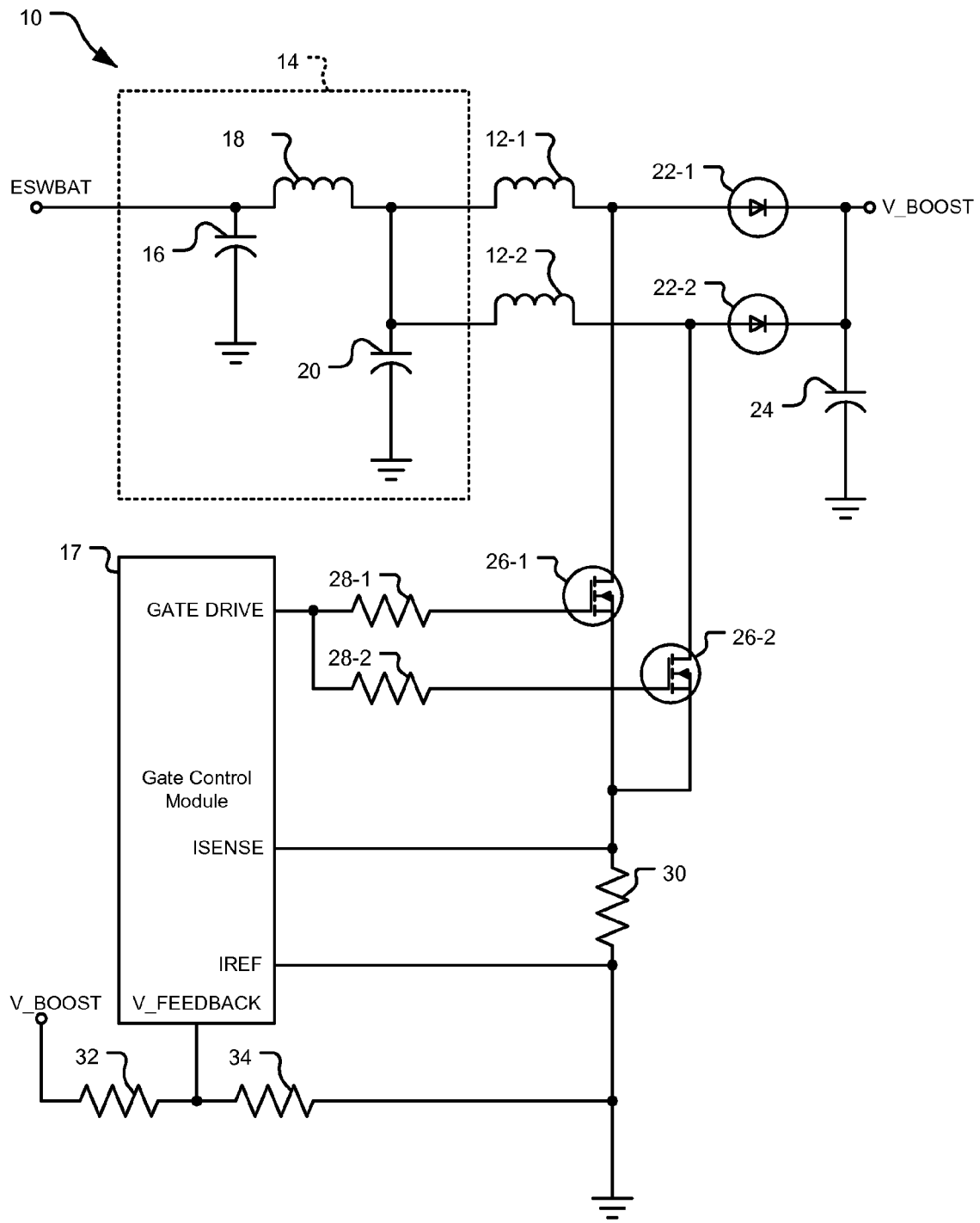
FIG. 1 is a functional block diagram of a dual circuit power supply.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram is shown of a switching power supply 10. Power supply 10 includes an inductor pair 12-1, 12-2 comprising a first inductor 12-1 and second inductor 12-2. Inductor pair 12-1, 12-2 can improve physical packaging options for power supply 10. For example inductor pair 12-1, 12-2 can provide a given inductance in a package that has a lower height than one that includes only a single inductor of similar inductance. One end of each inductor 12-1, 12-2, is connected to one end of respective capacitors 16, 20. The other ends of capacitors 16, 20 connect to ground. Power supply 10 may also includes a switching transistor that switches current through inductor pair 12-1, 12-2. A gate control module 17 controls the switching transistor based on a feedback signal that represents an output voltage V_BOOST. Gate control module 17 controls the switching transistor such that V_BOOST maintains a predetermined voltage.

An input filter module 14 filters battery power, ESWBAT, that is applied to one end of inductor pair 12. The depicted embodiment of input filter module 14 includes the capacitor 16, an inductor 18, and the capacitor 20 that arranged as a low-pass LC pi filter, however other arrangements may also be employed as is known in the art.

An input filter module 14 filters battery power, ESWBAT, that is applied to one end of inductor pair 12. The depicted embodiment of input filter module 14 includes a capacitor 16, an inductor 18, and a capacitor 20 that arranged as a low-pass LC pi filter, however other arrangements may also be employed as is known in the art.

Figure 2:
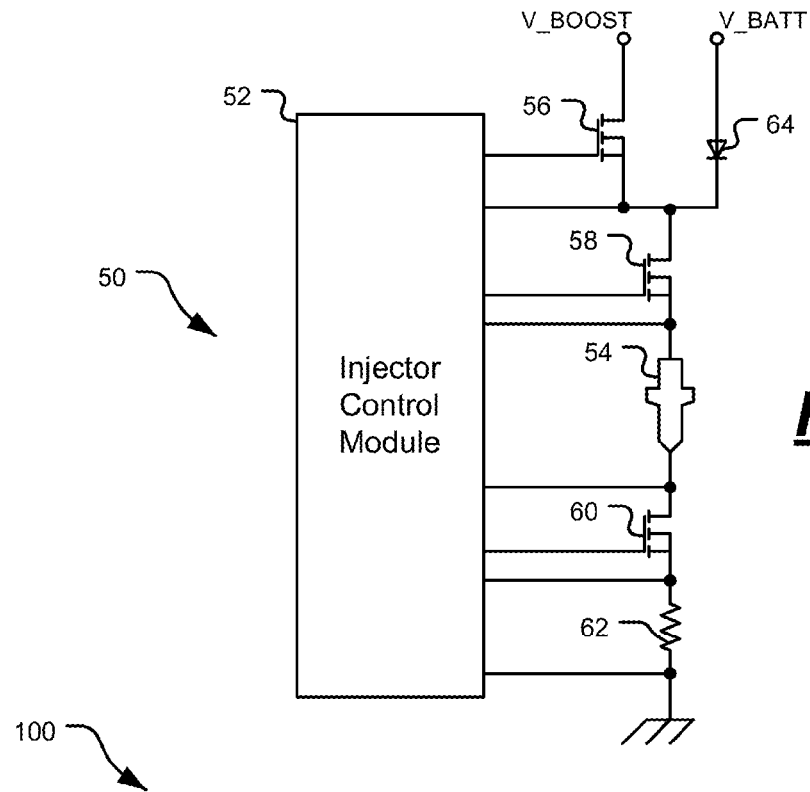
FIG. 2 is a functional block diagram of a fuel injector control circuit that is powered by the power supply of FIG. 1.

Outputs of inductor pair 12 are connected to anodes of respective ones of diodes 22-1 and 22-2, collectively referred to as diodes 22. The cathodes of diodes 22 are connected together and provide a boost voltage, V_BOOST, to a fuel injector control circuit 50 that is shown in FIG. 2. A capacitor 24 is connected between V_BOOST and ground. Capacitor 24 stores charge from inductor pair 12.

The junctions of inductor 12-1 and the anode of diode 22-1, and inductor 12-2 and the anode of diode 22-2, are connected to respective drains of a first MOSFET 26-1 and a second MOSFET 26-2, collectively referred to as MOSFETS 26. A resistor 28-1 and a resistor 28-2 connect respective gates of MOSFETS 26 to a GATE DRIVE output of the gate control module 17. Sources of MOSFETS 26 are connected to ground through a current sense resistor 30. The voltage developed across current sense resistor 30 is fed back to gate control module 17. A voltage divider comprising a resistor 32 and a resistor 34 provides a scaled V_BOOST feedback signal to gate control module 17.

Gate control module 17 monitors the current feedback signal from current sense resistor 30 FET and the scaled V_BOOST signal from the voltage divider of resistors 32, 24. Gate control module 17 generates the gate drive signal based on the current feedback signal and the scaled V_BOOST signal.

Operation of boost power supply 10 will now be described. Gate control module 17 generates the GATE_DRIVE signal that turns on MOSFETs 26. When MOSFETs 26 are on they draw current through inductor pair 12 and thereby increasing energy in their electric fields. When gate control module 17 turns off MOSFETs 26, the electric fields collapse and increasing the voltage at the anodes of diodes 22. As the voltage increases due to the collapsing electric field, diodes 22 start conducting and charge capacitor 24 to the predetermined voltage level of V_BOOST. Diodes 22 stop conducting when the voltage at their anodes is roughly equal to the voltage at their cathodes. The voltage at their anodes increases while the electric field has the energy, but as the energy in the electric field is depleted the anode voltage decreases toward the original battery voltage ESWBAT. Gate control module 17 adjusts a duty cycle of the GATE DRIVE signal to MOSFETs 26 based on the scaled V_BOOST voltage from the voltage divider of resistors 32, 34.

Referring now to FIG. 2, a functional block diagram is shown of fuel injector control circuit 50. Fuel injector control circuit 50 includes an injector control module 52. Injector control module 52 controls a plurality of fuel injectors 54. Only one fuel injector 54 and its associated components are shown for the sake of clarity. Those skilled in the art appreciate that a typical embodiment will employ a plurality of fuel injectors 54 and associated components. The associated components include high side transistor switches 56 and 58. The associated components also include a low side transistor switch 60. A current shunt 62 develops a signal voltage based on the amount of electrical current flowing through injector 54.

Injector control module 52 turns on high side transistor 58 and low side transistor 60 to turn on fuel injector 54. Injector control module 52 turns on high side transistor 56 to apply V_BOOST to injector 54. The voltage of V_BOOST with respect to ground is greater than the voltage of V_BATT with respect to ground. A diode 64 in series with V_BATT prevents V_BOOST from pulling up V_BATT while high side transistor 56 is turned on.

Figure 3:
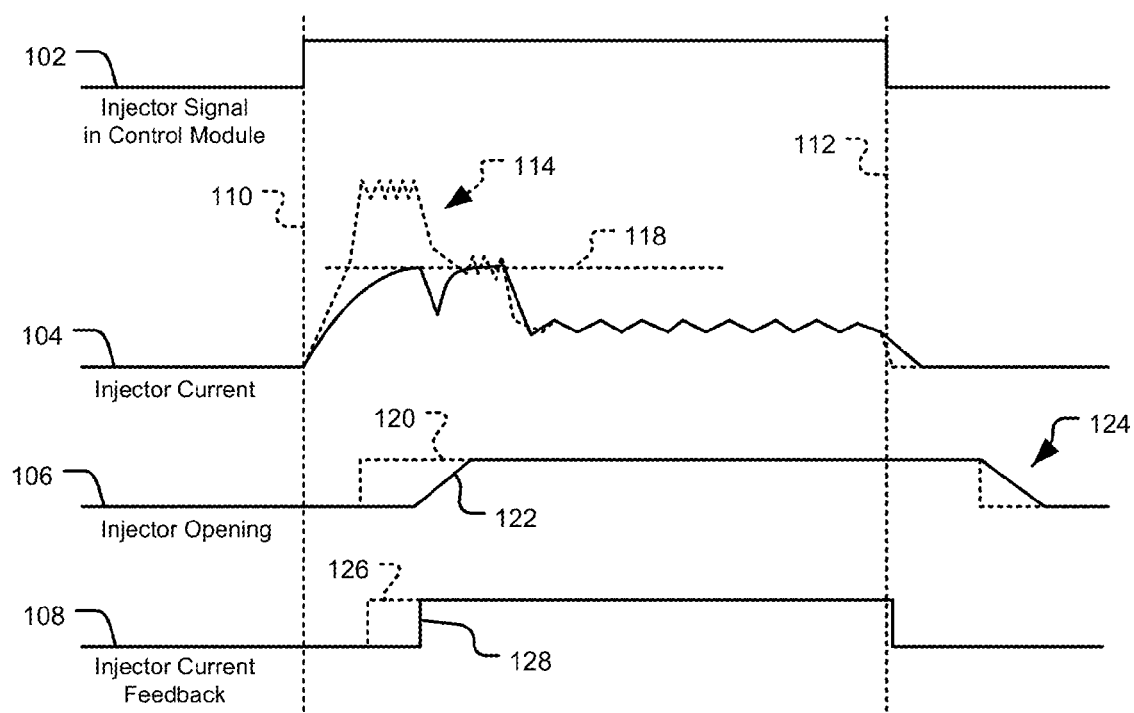
FIG. 3 is a set of waveforms of the circuit of FIG. 2.

Referring now to FIG. 3, a timing diagram 100 is shown of various signals in fuel injector control circuit 50 as fuel injector 54 is pulsed. A fuel injector control signal 102 determines when fuel injector 54 should be turned on and off. In the depicted embodiment a logic 0 or low indicates off however it should be appreciated that inverted logic also works. At a time 110 injector control module 52 indicates that fuel injector 54 should be turned on and switches transistors 56, 58, and 60 accordingly. At a time 112 injector control module 52 indicates that fuel injector 54 should be turned off and switches transistors 56, 58, and 60 accordingly.

Trace 104 represents the electrical current that flows through injector 52 and its associated transistors 58, and 60. At time 110 the current begins to rise. If both of the circuit paths through inductors 12, MOSFETs 26, and diodes 22 are functioning, then the current will continue to rise as shown by dashed trace 114 and exceed a predetermined current threshold 118. On the other hand if one of the circuit paths through inductors 12, MOSFETs 26, or diodes 22 has failed, then switching power supply 10 will not be able to provide sufficient energy to injector 54 when at high engine speed and injector control module 52 is generating dual fuel pulses per engine cycle. The injector current will therefore remain below predetermined current threshold 118 at least for a longer time as shown by the solid trace 104.

Trace 106 represents the physical opening and closing of fuel injector 52 such that it passes or blocks fuel flow respectively. When both of the circuit paths through inductors 12, MOSFETs 26, and diodes 22 are functioning properly, then fuel injector 52 opens and closes swiftly as shown by dotted trace 120. On the other hand if one of the circuit paths through inductors 12, MOSFETs 26, or diodes 22 has failed, then switching power supply 10 will not be able to provide sufficient energy to injector 52 during high engine speed and dual fuel pulses per engine cycle. Injector 52 will therefore open and close with lagged response such as is shown at 122 and 124. The lagged response introduces undesirable fuel metering error.

An injector current feedback signal 108 indicates at 126 when injector current 104 exceeds predetermined current threshold 118. If injector current 104 does not exceed predetermined current threshold 118 then feedback signal 108 will be delayed with the injector opening as shown at 128.

Figure 4:
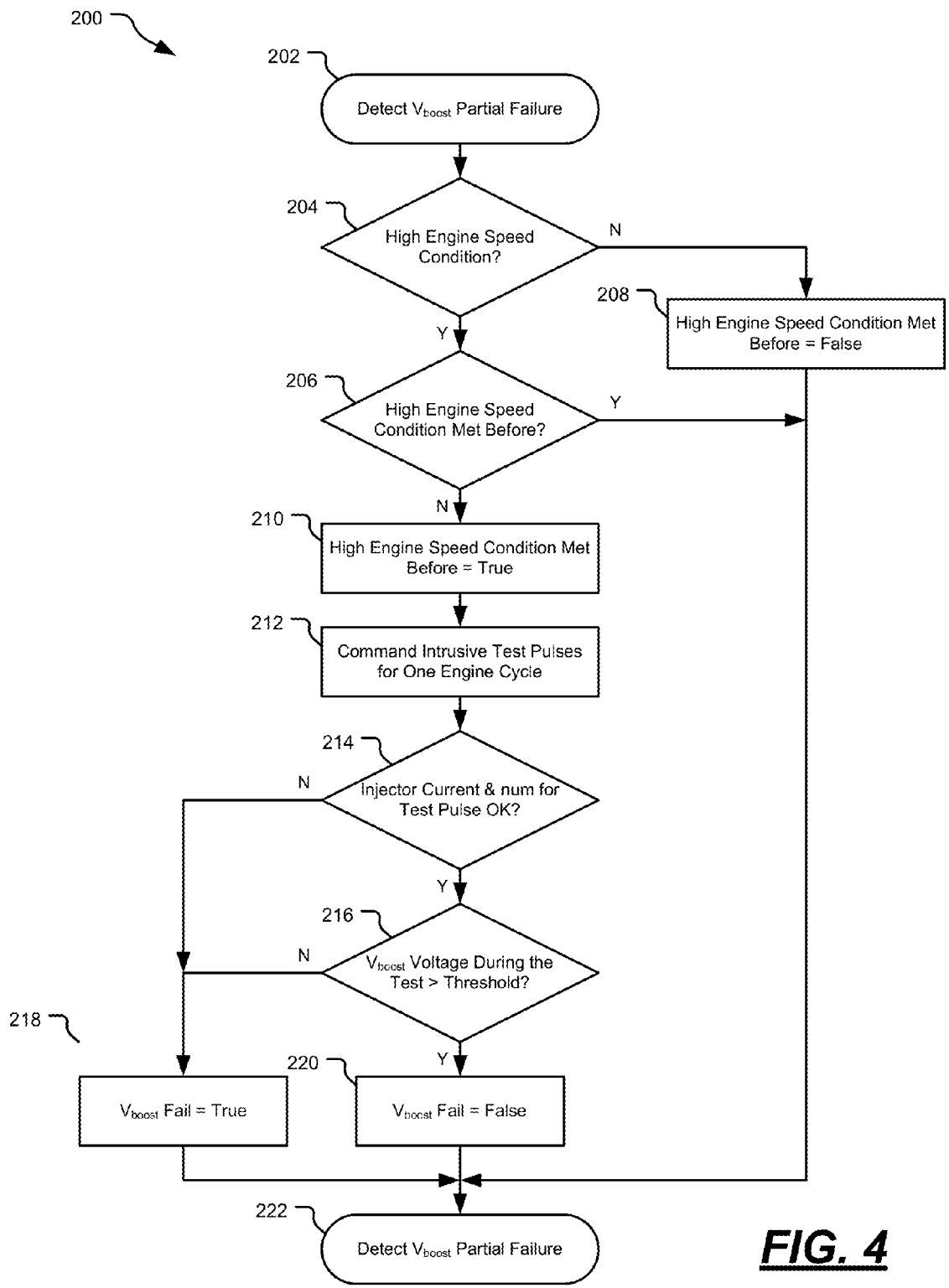
FIG. 4 is a flow chart of a diagnostic method that diagnoses the inductance pair of FIG. 1.

Referring now to FIG. 4, a flow chart is shown of a diagnostic method 200. Diagnostic method 200 is executed from time to time, preferably periodically, and diagnoses the circuit paths through inductors 12, MOSFETs 26, and diodes 22 that are shown in FIG. 1. Diagnostic method 200 can be performed by injector control module 52. In one embodiment method 200 can be performed once per trip when engine RPM is above a predetermined speed threshold. Stated briefly, method 200 momentarily switched to double injection for a small number of engine cycles that can be experimentally determined to load power supply 10. Method 200 then checks for failure to reach peak injector current within a predetermined amount of time. Method 200 also monitors V_BOOST and generates a moving average. If the moving average sags below a predetermined minimum voltage then a problem is indicated with a circuit path through one of inductors 12, MOSFETs 26, and diodes 22.

An embodiment of method 200 will now be described in more detail. Control begins in block 202 and immediately proceeds to decision block 204. In decision block 204 control determines whether the engine speed exceeds a predetermined engine speed. The predetermined speed can be chosen such that the duty cycle of fuel injector 54 needs both paths of V_BOOST to be working in order to maintain V_BOOST at a satisfactory voltage. If the engine speed is too slow then control branches to block 208. In block 208 control clears a flag that indicates whether the engine speed exceeded the predetermined speed on the previous execution. Control then exits through block 222.

Returning now to decision block 204, if control determines that the engine speed exceeds the predetermined speed then control proceeds to decision block 206. In decision block 206 control determines whether the engine speed exceeded the predetermined engine speed on the prior execution. If so then control exits via block 222. If not then control proceeds to block 210 and sets a flag that indicates the engine speed exceeded the predetermined engine speed on the prior execution. Control then proceeds to block 212 and modifies the fuel injector pulse width. The duration of the pulse width modification can be experimentally determined. The modification should increase the power consumption of fuel injectors 54 enough so that it exposes weakness in V_BOOST due to a failed one of the circuit paths through inductors 12, MOSFETs 26, or diodes 22. In the depicted embodiment the fuel injector pulse width is modified for one engine cycle to limit pollution effects, however it should be understood by those skilled in the art that the duration can be changed to satisfy local pollution limits if any.

Control then proceeds to decision block 214 and determines whether the driver current 104 (shown in FIG. 3) remained greater than a predetermined driver current for the duration of the fuel pulse width modification that was applied in block 212. If so then control proceeds to decision block 216 and determines whether the V_BOOST remained greater than a predetermined boost limit voltage for the duration of the fuel pulse width modification that was applied in block 212. If so then control proceeds to block 220 and indicates that the V_BOOST circuit has passed the test. On the other hand if the determinations in either of decisions blocks 214 or 216 are negative, then control proceeds to block 218 and indicates that the V_BOOST circuit has failed the test. Control exits through block 222 from blocks 218 and 220.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A power supply diagnostic circuit, comprising:
a switching power supply that generates a voltage for powering a fuel injector; and
an injector control module that selectively applies the voltage to the fuel injector and monitors a resultant electrical current flow through the fuel injector, wherein the switching power supply includes a dual path circuit comprising two inductors, two MOSFETs, and two diodes, and the injector control module determines whether one path of the dual path circuit is defective based on the electrical current flow,
wherein the injector control module determines whether the one path is defective based on whether the electrical current flow exceeds a predetermined current limit within a predetermined amount of time after the voltage is applied to the fuel injector during high engine speed and dual fuel injection pulses.

2. A power supply diagnostic circuit, comprising:
a switching power supply that generates a voltage for powering a fuel injector; and
an injector control module that selectively applies the voltage to the fuel injector and monitors a resultant electrical current flow through the fuel injector, wherein the switching power supply includes a dual path circuit comprising two inductors, two MOSFETs, and two diodes, and the injector control module determines whether one path of the dual path circuit is defective based on the electrical current flow,
wherein the injector control module determines whether the one path is defective based on whether the voltage that is applied to the fuel injector sags below a predetermined voltage limit during high engine speed and dual fuel injection pulses.

3. The power supply diagnostic circuit of claim 1 further comprising a current shunt that generates a signal based on the current flow and communicates the signal to the injector control module.

4. A power supply diagnostic circuit, comprising:
a switching power supply that generates a voltage for powering a fuel injector; and
an injector control module that selectively applies the voltage to the fuel injector and monitors a resultant electrical current flow through the fuel injector, wherein the switching power supply includes a dual path circuit comprising two inductors, two MOSFETs, and two diodes, and the injector control module determines whether one path of the dual path circuit is defective based on the electrical current flow,
further comprising at least one transistor that is controlled by the injector control module and that switches the voltage that is applied to the fuel injector.

5. The power supply diagnostic circuit of claim 2 wherein the injector control module modifies the fuel injector pulse width in association with determining whether the one path is defective.

6. A diagnostic method for a power supply circuit, the method comprising:
employing a boost power supply that includes a dual path circuit for generating a voltage for powering a fuel injector;
selectively applying the voltage to the fuel injector;
monitoring a resultant electrical current flow through the fuel injector; and
determining whether one path of the dual path circuit is defective based on whether the electrical current flow exceeds a predetermined current limit within a predetermined amount of time after the voltage is applied to the fuel injector during high engine speed and dual fuel injection pulses.

7. A diagnostic method for a power supply circuit, the method comprising:
employing a boost power supply that includes a dual path circuit for generating a voltage for powering a fuel injector;
selectively applying the voltage to the fuel injector;
monitoring a resultant electrical current flow through the fuel injector; and
determining whether one path of the dual path circuit is defective based on whether the voltage that is applied to the fuel injector sags below a predetermined voltage limit during high engine speed and dual fuel injection pulses.

8. The method of claim 6 further comprising generating a signal based on the current flow and communicating the signal to an injector control module.

9. A diagnostic method for a power supply circuit, the method comprising:
employing a boost power supply that includes a dual path circuit for generating a voltage for powering a fuel injector;
selectively applying the voltage to the fuel injector;
monitoring a resultant electrical current flow through the fuel injector;
determining whether one path of the dual path circuit is defective based on the electrical current flow; and
switching the voltage that is applied to the fuel injector.

10. The method of claim 7 further comprising modifying the fuel injector pulse width in association with determining whether the one path is defective.

11. A power supply diagnostic circuit, comprising:
switching power supply means for generating a voltage for powering a fuel injector;
injector control means for selectively applying the voltage to the fuel injector and monitoring a resultant electrical current flow through the fuel injector, wherein the switching power supply means includes a dual path circuit comprising two inductors, two MOSFETs, and two diodes, and the injector control means determines whether one path of the dual path circuit is defective based on the electrical current flow; and
at least one transistor switching means for switching the voltage that is applied to the fuel injector.

12. The power supply diagnostic circuit of claim 11 wherein the injector control means includes diagnostic means for determining whether the one path is defective based on whether the electrical current flow exceeds a predetermined current limit within a predetermined amount of time after the voltage is applied to the fuel injector during high engine speed and dual fuel injection pulses.

13. The power supply diagnostic circuit of claim 11 wherein the injector control means includes means for determining whether the one path is defective based on whether the voltage that is applied to the fuel injector sags below a predetermined voltage limit during high engine speed and dual fuel injection pulses.

14. The power supply diagnostic circuit of claim 11 further comprising current shunt means for generating a signal based on the current flow and communicating the signal to the injector control means.

15. The power supply diagnostic circuit of claim 11 wherein the injector control means modifies the fuel injector pulse width in association with determining whether the one path is defective.

* * * * *